United States Patent
Sharma et al.

(10) Patent No.: US 12,011,999 B2
(45) Date of Patent: Jun. 18, 2024

(54) HOLOGRAPHIC DISPLAY CALIBRATION BY HOLOGRAPHIC PHASE MODULATION

(71) Applicant: GM Global Technology Operations LLC, Detroit, MI (US)

(72) Inventors: Manoj Sharma, Troy, MI (US); Kai-Han Chang, Sterling Heights, MI (US); Thomas A. Seder, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 163 days.

(21) Appl. No.: 17/814,598

(22) Filed: Jul. 25, 2022

(65) Prior Publication Data
US 2024/0025249 A1 Jan. 25, 2024

(51) Int. Cl.
| B60K 35/00 | (2024.01) |
| H04N 9/31 | (2006.01) |
| B60K 35/23 | (2024.01) |
| B60K 35/60 | (2024.01) |
| B60K 35/90 | (2024.01) |

(52) U.S. Cl.
CPC ............ *B60K 35/00* (2013.01); *H04N 9/3194* (2013.01); *B60K 35/23* (2024.01); *B60K 35/60* (2024.01); *B60K 35/90* (2024.01); *B60K 2360/29* (2024.01); *B60K 2360/785* (2024.01)

(58) Field of Classification Search
CPC ............ B60K 35/00; B60K 2370/1529; B60K 2370/29; B60K 2370/92; B60K 2370/785; H04N 9/3194
See application file for complete search history.

(56) References Cited

U.S. PATENT DOCUMENTS

| 9,891,586 | B2* | 2/2018 | Christmas | G03H 1/2294 |
| 2008/0239420 | A1* | 10/2008 | McGrew | G02F 1/292 |
| | | | | 359/11 |
| 2009/0180194 | A1* | 7/2009 | Yamaguchi | G02B 27/0176 |
| | | | | 359/15 |
| 2013/0128334 | A1* | 5/2013 | Stephen | G02B 5/189 |
| | | | | 359/279 |
| 2016/0379606 | A1* | 12/2016 | Kollin | G03H 1/2294 |
| | | | | 345/428 |

(Continued)

FOREIGN PATENT DOCUMENTS

| CN | 102656501 A | * | 9/2012 | ............. B60K 35/00 |
| CN | 105116546 A | * | 12/2015 | ............. B60K 35/00 |

OTHER PUBLICATIONS

Wu, Nai-fu translation of CN 105116546 A Sep. 11, 2015 (Year: 2015).*

(Continued)

*Primary Examiner* — Zaihan Jiang
(74) *Attorney, Agent, or Firm* — Vivacqua Crane, PLLC (57) ABSTRACT

A method for holographic display calibration using phase modulation includes projecting an initial graphic on a windshield of a vehicle, capturing an image of the initial graphic with a camera inside a vehicle, determining a loss function value between the image of the initial graphic captured by the camera and a target graphic, modulating a phase of a light beam generating the initial graphic using the loss function value to generate an updated graphic, and displaying the updated graphic on the windshield of the vehicle.

14 Claims, 4 Drawing Sheets

(56) References Cited

U.S. PATENT DOCUMENTS

| | | | | |
|---|---|---|---|---|
| 2017/0142408 A1* | 5/2017 | Ben-Arie | ............. | H04N 13/344 |
| 2017/0255013 A1* | 9/2017 | Tam | .................... | G03H 1/2294 |
| 2018/0259904 A1* | 9/2018 | Georgiou | ............ | G02F 1/13725 |
| 2020/0192287 A1* | 6/2020 | Chakravarthula | ... | G03H 1/0866 |
| 2021/0325827 A1* | 10/2021 | Song | .................... | G03H 1/0808 |

OTHER PUBLICATIONS

Sugiyama, Keiji translation of CN 102656501 A Dec. 8, 2010 (Year: 2010).*

* cited by examiner

HOLOGRAPHIC DISPLAY CALIBRATION BY HOLOGRAPHIC PHASE MODULATION

The present disclosure relates to a system and method for holographic display calibration by holographic phase modulation.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Holographic head-up displays (HUDs) project graphics on a windshield. In holographic HUDs, a light source emits a coherent light beam onto a spatial light modulator (SLM). The graphics on the SLM are then projected on the windshield. The light beam carrying the graphics information then reflects off the windshield to create an image in the eyellipse. However, the reconstructed graphics image may have obscurities due to the system-generated errors from the SLM, the pupil replicator, and the windshield surface roughness and/or disproportion. Hence, it is desirable to develop a calibration method and system for minimizing these system-generated errors.

SUMMARY

The present disclosure describes a method and a system for holographic display calibration by holographic phase modulation. The presently disclosed system includes a camera inside the vehicle to capture the graphics generated by the holographic HUD. The system executes a method in which an initial hologram is used to project the graphics onto the windshield, and the camera captures of image of the initial hologram. An optimization algorithm is used to correct the initial hologram to get rid of the system generated noise and enhance the contrast in the final output (i.e., the final image). At the completion of the algorithm, the updated, optimized hologram is created. The difference values between initial hologram and optimized hologram are stored as a look up table. When the vehicle is operating and the HUD is being used, the difference values are applied to the hologram for each frame. Multiple look up tables are created for multiple eyellipse positions and an eye tracker on the vehicle helps deciding which look up table is applied depending on the driver's eye location.

In an aspect of the present disclosure, a method for holographic display calibration using phase modulation includes projecting an initial graphic image via a windshield of a vehicle, capturing an image of the initial graphics in the eyellipse with a camera inside the vehicle, determining a loss function value between the captured image of the initial captured by the camera and a known target, modulating a phase of a light beam generating the initial graphics using the loss function value to generate an updated graphics. The method may further include displaying the updated graphics on the windshield of the vehicle.

In an aspect of the present disclosure, determining the loss function value includes determining that the loss function value is ideally zero or less than a threshold. The method further includes refraining from repeating the capturing, determining, modulating, and displaying steps in response to determining that the loss function value is less than the threshold. As a non-limiting example, the threshold may be two percent.

In an aspect of the present disclosure, the loss function value is determined using a following equation:

$$\mathcal{L} = \sum_{m=1}^{M} \sum_{n=1}^{N} |a_{cap}(m, n) - a_{target}(m, n)|$$

where:

$\mathcal{L}$ is the loss function value;

M is a total number of pixels of the image captured by the camera in an x-direction;

N is a total number of pixels of the image captured by the camera in an y-direction;

n is one of the total number of pixels M in the x-direction;

m is one of the total number of pixels N in the y-direction;

$a_{target}$ is the target graphic; and $a_{cap}$ is the image captured by the camera.

In an aspect of the present disclosure, modulating the phase of the light beam includes modulating the phase of the light beam from a first phase value to a second phase value. The method further includes determining the loss function value between the image of the initial graphic with the first phase value and the target graphic. The method further includes determining the loss function value between the image of the updated graphic generated by the light beam with the second phase value and the target graphic.

In an aspect of the present disclosure, the loss function value between the image of the initial graphic with the first phase value and the target graphic is a first loss function value. The loss function value between the image of the updated graphic generated by the light beam with the second phase value and the target graphic is a second loss function value. The method further includes determining which of the first loss function value and the second loss function value has a smallest value. The method further includes saving the smallest value.

In an aspect of the present disclosure, the method further includes determining, for the first pixel of the hologram, an average contrast value of the image of the initial graphic captured by the camera.

In an aspect of the present disclosure, the average contrast value of the image of the initial graphic captured by the camera is determined using a following equation:

$$C = \frac{\overline{W} - \overline{B}}{\overline{W} + \overline{B}}$$

where:

$\overline{W}$ is an average intensity of a white portion of the image captured by the camera;

$\overline{B}$ is an average intensity of a background portion of the image captured by the camera; and C is the average contrast value.

In an aspect of the present disclosure, the image is one of a plurality of images at different eyellipse positions. Capturing the image of the initial graphic with the camera inside the vehicle includes capturing the plurality of images at the different eyellipse positions.

The present disclosure also describes a vehicle with a system for holographic calibration by holographic phase modulation. In an aspect of the present disclosure, the vehicle includes a windshield and a holographic head-up display (HUD). The holographic HUD includes a spatial light modulator (SLM) and a light source. The light source is configured to emit a light beam toward the SLM. The SLM is configured to modulate the light beam. The holographic HUD is configured to project an initial graphic on the windshield. The vehicle further includes a camera and a controller. The camera is positioned to capture an image of the initial graphic. The controller is in communication with the holographic HUD and the camera. The controller is programmed to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Reference will now be made in detail to several examples of the disclosure that are illustrated in accompanying drawings. Whenever possible, the same or similar reference numerals are used in the drawings and the description to refer to the same or like parts or steps.

Figure 1:
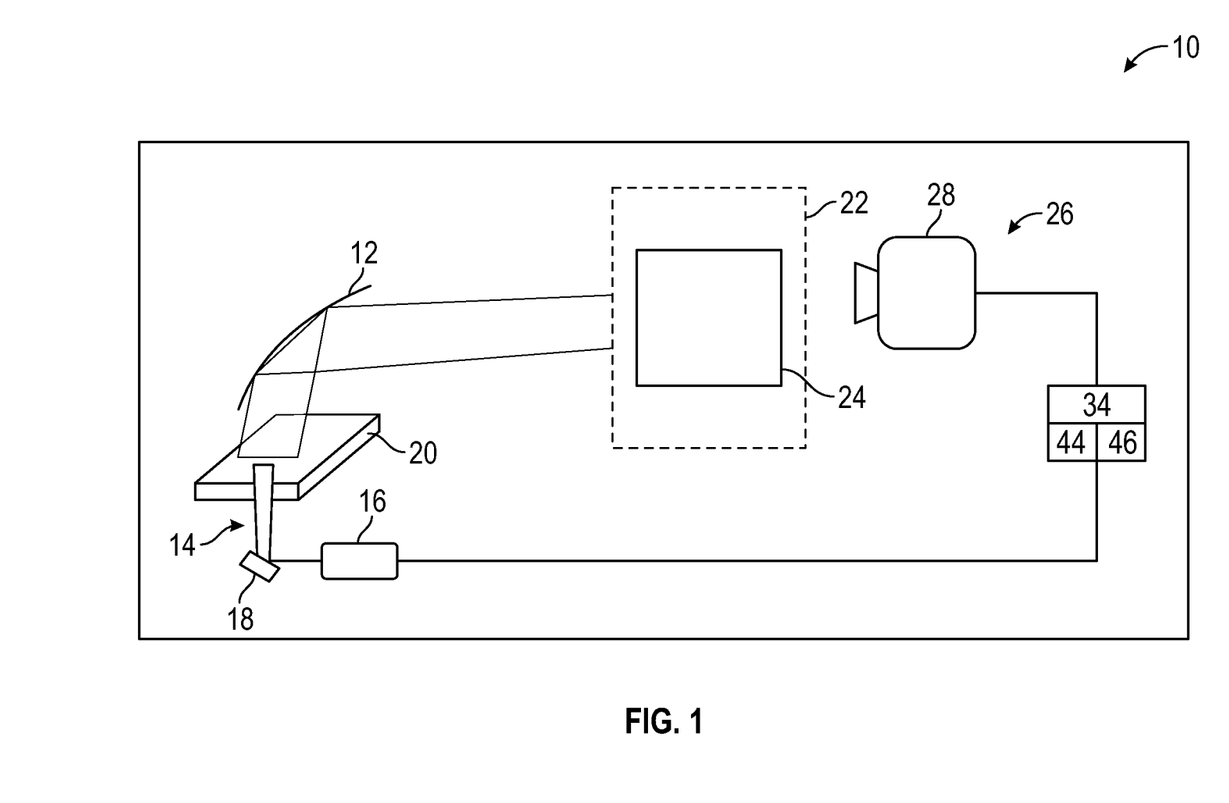
FIG. 1 is a block diagram of a vehicle including a system for holographic display calibration.

With reference to FIG. 1, a vehicle 10 includes a windshield 12 and a holographic head-up display (HUD) 14 configured to project one or more graphics 24 on the windshield 12. The holographic HUD 14 may be configured as an augmented reality (AR) HUD and includes a light source 16, such as a coherent light source, a spatial light modulator (SLM) 18, and a lens 20 for directing the graphics 24 toward the windshield 12. In the holographic HUD 14, the coherent light beam emitted by the light source 16 is used to project the graphics by illuminating the holograph displayed by the SLM 18. Then, the light beam carrying the graphics information reflects off the windshield 12 to create a graphics 24 in the eyellipse 22. The term "eyellipse" means a statistical representation of driver eye locations inside the vehicle 10.

With continued reference to FIG. 1, the vehicle 10 includes a system 26 for calibrating the holographic display 14 by holographic phase modulation. The system 26 includes a controller 34 and one or more cameras 28 in communication with the controller 34. The cameras 28 are disposed inside the vehicle 10 and are configured and positioned to capture one or more images of the graphics 24 projected toward the eyellipse 22 inside the vehicle 10. The controller 34 includes at least one processor 44 and a non-transitory computer readable storage device or media 46. The processor 44 may be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10. The controller 34 of the vehicle 10 may be referred to as a vehicle controller and may be programmed to execute the method 100, 200, and 300 described in detail below. The controller 34 is also in communication with the light source 16 and the SLM 18. Therefore, the controller 34 is programmed to control the operation of the light source 16 and the SLM 18.

Figure 2:
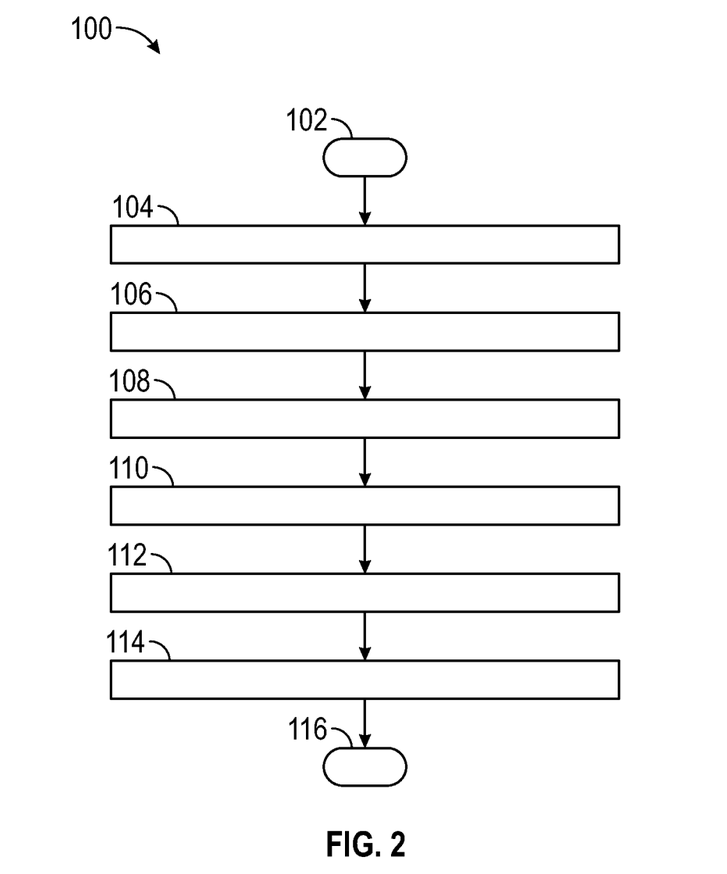
FIG. 2 is flowchart of a method for holographic display calibration using holographic phase modulation.

FIG. 2 is a flowchart of a method 100 for calibrating the holographic HUD 14 using phase modulation. The holographic HUD 14 may generate graphic errors that may lead to unacceptable image quality, and the method 100 corrects these errors using optimization-based calibration, thereby improving image quality. Specifically, the method 100 adaptively modifies the holograph phase and creates a lookup table for error minimization, including errors from the windshield 12 and the pupil replicator. The method 100 starts at block 102. Then, the method 100 proceeds to block 104. At block 104, the camera 28 is moved (if necessary) so that the field of view of the camera 28 is directed toward the eyellipse 22. As discussed above, the term "eyellipse" means a statistical representation of driver eye locations inside the vehicle 10. At this point, the camera 28 can capture an image of the graphic generated by the holographic HUD 14 as perceived by the vehicle operator. It is envisioned that the camera 28 may be movable inside the vehicle 10. To this end, the controller 34 is programmed to command the camera 28 to move until the field of view of the camera 28 points toward the eyellipse 22. Then, the method 100 continues to block 106.

At block 106, the controller 34 commands the holographic HUD 14 to project an initial graphic on the windshield 12 of the vehicle 10. Next, the method 100 proceeds to block 108. At block 108, once the initial graphic on the windshield 12 of the vehicle 10 is projected on the windshield 12, the controller 34 commands the camera 28 to capture an image of the initial graphic generated by the holographic HUD 14. Upon receipt of this command, the camera 28 captures an image of the initial graphic. Then, the method 100 continues to block 110. At block 110, the controller 34 executes parts of the method 200 (FIG. 3) and/or the method 300 (FIG. 4) discussed below to minimize the graphic errors created by the windshield 12 and/or the pupil replicator, among other things. At block 110, the controller 34 executes one or more iterative optimization algorithms to adaptively module the phase of the light beams generating the graphics 24, thereby improving the quality of the graphics 24. In other words, the phase of the hologram displayed onto the SLM is modulated. Next, the method 100 proceeds to block 112. At block 112, the controller 34 generates an updated, optimized graphic using the iterative optimization algorithms executed at block 110. Then, the method 100 proceeds to block 114. At block 114, the controller 34 creates multiple look-up with phase values that yields the lowest loss function value between image of the initial graphic 24 captured by the camera 28 and a target graphic, which may be saved on the computer readable media 46. The phase values may be saved, for example, on the computer readable storage device or media 46. The camera 28 may function as an eye tracker that track the position of the head and eyes of the vehicle operator. Accordingly, the controller 34 can create multiple look-up tables for different eyellipse positions. The controller 34 is programmed to pick and apply the suitable look-up table based on the head and/or positions of the vehicle operator. Then, the method 100 proceeds to block 116. At block 116, the method 100 ends.

Figure 3:
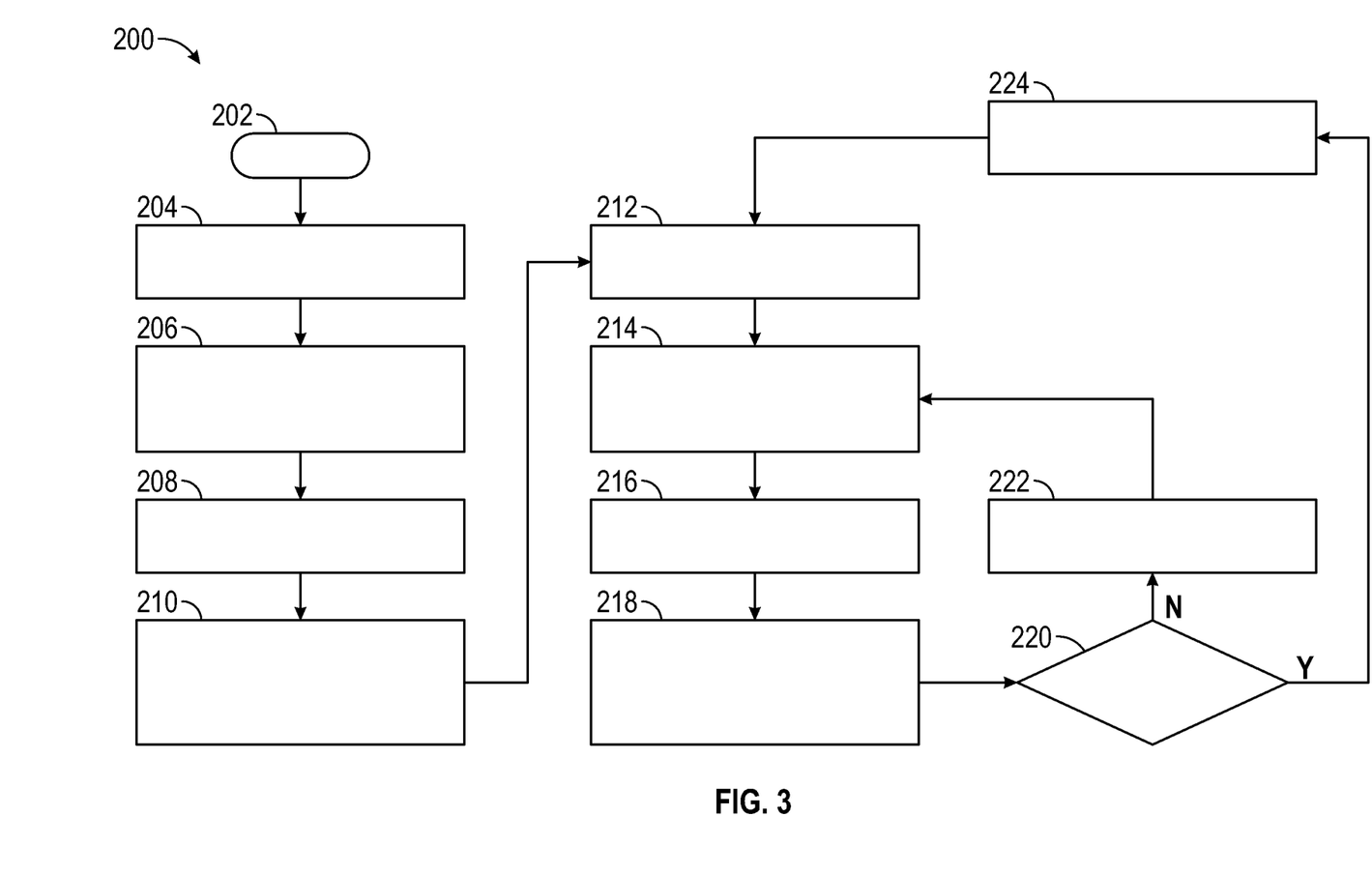
FIG. 3 is a flowchart for a method to minimize graphic error using holographic phase modulation.

FIG. 3 is a flowchart of a method 200 for minimizing errors in the graphics 24. The method 200 begins at block 202. Then, the method 200 proceeds to block 202. At block 202, the camera 28 is moved (if necessary) so that the field of view of the camera 28 is directed toward the eyellipse 22. Next, the method 200 proceeds to block 206.

At block 206, the controller 34 commands the holographic HUD 14 to project an initial graphic on the windshield 12 of the vehicle 10. The graphic reflects from the windshield 12 to the eyellipse. Next, the method 200 proceeds to block 208. At block 208, once the initial, noisy graphic 24 is projected on the windshield 12 of the vehicle 10, the controller 34 commands the camera 28 to capture an image of the initial graphic generated by the holographic HUD 14 in the eyellipse. Upon receipt of this command, the camera 28 captures an image of the initial graphic 24 in the eyellipse. Then, the method 200 continues to block 210.

At block 210, the controller 34 determines (e.g., calculates) the loss function value between the initial graphics 24 and a target graphics (which is saved on non-transitory computer readable storage device or media 46) for every pixel of the initial graphics and a target graphics. To do so, the controller 34 may use the following equation:

$$\mathcal{L} = \sum_{m=1}^{M} \sum_{n=1}^{N} |a_{cap}(m, n) - a_{target}(m, n)|$$

where:
$\mathcal{L}$ is a loss function value for a single pixel;
M is the total number of pixels of the image captured by the camera 28 in an x-direction;
N is the total number of pixels the image captured by the camera 28 in an y-direction;
n is one of the total number of pixels M in the x-direction;
m is one of the total number of pixels N in the y-direction;
$a_{target}$ is the target graphic; and
$a_{cap}$ is the image captured by the camera 28.

The x-direction may be a horizontal direction, and the y-direction may be a vertical direction. After block 210, the method 200 continues to block 212. At block 212, the controller 34 selects a first pixel of the initial or subsequently updated graphic 24. Then, the method 200 continues to block 214. At block 214, the controller 34 commands the SLM 18 to change the phase of the light beam at the selected pixel (e.g., the first pixel) in small, predetermined step (±δ) in numerous iterations k. After changing the phase value of the light beam at the selected pixel at the selected pixel (e.g., the first pixel) of the initial graphics 24 (or subsequently updated graphics 24), the controller 34 commands the camera 28 to capture the updated graphics 24 in numerous iterations k. Upon receipt of the command from the controller 34, the camera 28 captures an image of the updated graphics 24 after changing the phase value of the light beam at the selected pixel at the selected pixel (e.g., the first pixel) of the graphics 24. Then, the method 200 continues to block 216. At block 216, the controller 34 calculates the loss function value, for each iteration k, between the initial (or subsequently updated) graphics 24 and the target graphics using equation above. Then, the method 100 continues to block 218. At block 218, the controller 34 saves and keeps the phase value for which the loss-function has the smallest value at the selected pixel (e.g., first pixel) of the graphics 24. Next, the method 100 proceeds to block 220.

At block 220, the controller 34 determines whether the actions described in blocks 214, 216, and 218 have been performed for all the pixels of the graphics 24. If not all pixels of the graphics 24 have been analyzed in accordance to blocks 212, 214, 216, and 218, then the method 200 continues to block 222. At block 222, the controller 34 selects another pixel of the graphics 24. Then, the method 200 proceeds to block 214.

If, at block 220, the controller 34 determines that the actions described in blocks 214, 216, and 218 have been performed for all the pixels of the graphics 24, then the method 200 continues to block 224. At block 224, the controller 43 determines that blocks 212, 214, 216, and 218 should be repeated for all the pixels of the SLM 18. Thus, after block 224, the method 200 returns to block 212. The method 200 ends when the overall loss function value between the latest, updated graphics 24 and the target graphics is less than a predetermined value (e.g., two percent). In other words, the controller 34 refrains from executing any other action of the method 200 when the overall loss function value between the latest, updated graphics 24 and the target graphics is less than a predetermined value (e.g., two percent).

Figure 4:
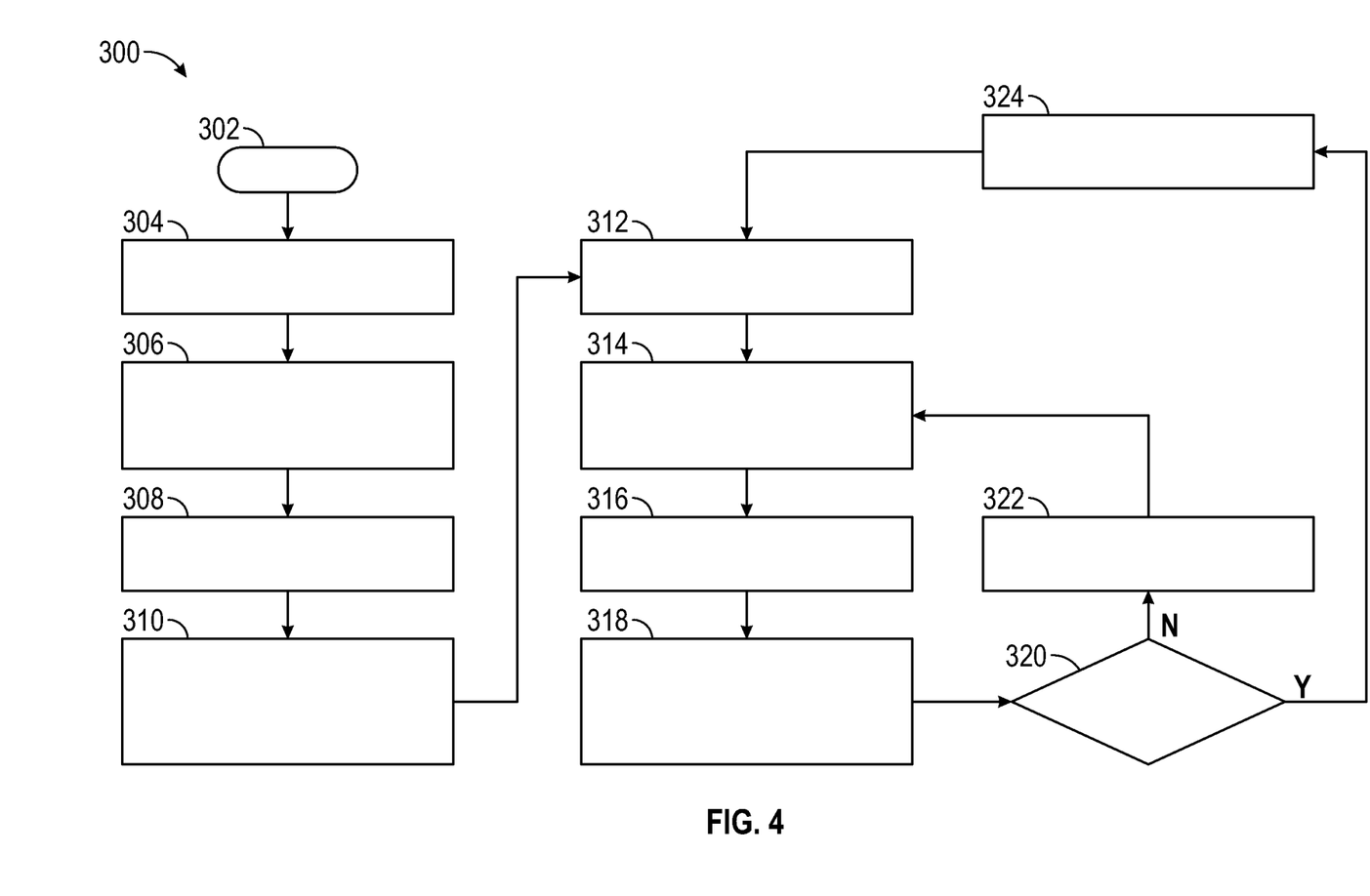
FIG. 4 is a flowchart for a method for enhancing contrast in a graphic.

FIG. 4 is a flowchart of a method 300 for enhancing contrast in the graphics 24. The method 300 begins at block 302. Then, the method 300 proceeds to block 302. At block 302, the camera 28 is moved (if necessary) so that the field of view of the camera 28 is directed toward the eyellipse 22. Next, the method 300 proceeds to block 306.

At block 306, the controller 34 commands the holographic HUD 14 to project an initial graphic on the windshield 12 of the vehicle 10. Next, the method 300 proceeds to block 308. At block 308, once the initial, noisy graphic on the windshield 12 of the vehicle 10 is projected on the windshield 12, the controller 34 commands the camera 28 to capture an image of the initial graphic generated by the holographic HUD 14. Upon receipt of this command, the camera 28 captures an image of the initial graphic. Then, the method 300 continues to block 310.

At block 310, the controller 34 determines (e.g., calculates) an average contrast value of the image captured by the camera 28 for every pixel of the image graphics captured by the camera 28. To do so, the controller 34 may use the following equation:

$$C = \frac{\overline{W} - \overline{B}}{\overline{W} + \overline{B}}$$

where:
- $\overline{W}$ is an average intensity of a white portion of the image captured by the camera 28;
- $\overline{B}$ is an average intensity of a background portion of image captured by the camera 28; and
- C is the average contract value.

After block 310, the method 300 continues to block 312. At block 312, the controller 34 selects a first pixel of the initial or subsequently updated graphic 24. Then, the method 300 continues to block 314. At block 314, the controller 34 commands the SLM 18 to change the phase of the light beam at the selected pixel (e.g., the first pixel) in small, predetermined step ($\pm\delta$) in numerous iterations k. After changing the phase value of the light beam at the selected pixel at the selected pixel (e.g., the first pixel) of the initial graphics 24 (or subsequently updated graphics 24), the controller 34 commands the camera 28 to capture the updated graphics 24 in numerous iterations k. Upon receipt of the command from the controller 34, the camera 28 captures an image of the updated graphics 24 after changing the phase value of the light beam at the selected pixel at the selected pixel (e.g., the first pixel) of the graphics 24. Then, the method 300 continues to block 316. At block 316, the controller 34 calculates the average contrast value, for each iteration k, using equation above. Then, the method 300 continues to block 318. At block 318, the controller 34 saves and keeps the phase value for the average contrast value has the highest value at the selected pixel (e.g., first pixel) of the graphics 24. Next, the method 100 proceeds to block 320.

At block 320, the controller 34 determines whether the actions described in blocks 214, 216, and 218 have been performed for all the pixels of the graphics 24. If not all pixels of the graphics 24 have been analyzed in accordance to blocks 312, 314, 316, and 318, then the method 300 continues to block 322. At block 322, the controller 34 selects another pixel of the graphics 24. Then, the method 300 proceeds to block 314. Thus, after block 324, the method 300 returns to block 312.

If, at block 320, the controller 34 determines that the actions described in blocks 214, 216, and 218 have been performed for all the pixels of the graphics 24, then the method 300 continues to block 324. At block 324, the controller 43 determines that blocks 312, 314, 316, and 318 should be repeated for all the pixels of the SLM 18. The method 300 ends when the overall average contrast value between the latest, updated graphics 24 and the target holographic increases less than a predetermined contrast threshold (e.g., one percent). In other words, the controller 34 refrains from executing any other action of the method 300 when the overall average contrast value between the latest, updated graphics 24 and the target holographic increases less than a predetermined contrast threshold (e.g., one percent).

While exemplary embodiments are described above, it is not intended that these embodiments describe all possible forms encompassed by the claims. The words sed in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for holographic display calibration using phase modulation, comprising:
    projecting an initial graphic on a windshield of a vehicle;
    capturing an image of the initial graphic in an eyellipse with a camera inside the vehicle;
    iteratively changing a phase value of a light beam generating a plurality of pixels of the initial graphic by a predetermined step to generate a plurality of updated graphics until a loss function value between each of the plurality of updated graphics and a target graphic is less than a predetermined value;
    iteratively determining the loss function value between each of the plurality of updated graphics and the target graphic until the loss function value is less than the predetermined value; and
    displaying a latest one of the plurality of updated graphics on the windshield of the vehicle.

2. The method of claim 1, wherein the loss function value is determined using a following equation:

$$\mathcal{L} = \sum_{m=1}^{M}\sum_{n=1}^{N} |a_{cap}(m, n) - a_{target}(m, n)|$$

where:
$\mathcal{L}$ is the loss function value;
M is a total number of pixels of the image captured by the camera in an x-direction;
N is a total number of pixels of the image captured by the camera in an y-direction;
n is one of the total number of pixels M in the x-direction;
m is one of the total number of pixels N in the y-direction;
$a_{target}$ is the target graphic; and
$a_{cap}$ is the image captured by the camera.

3. The method of claim 1, further comprising saving a phase value that corresponds to a lowest loss function value.

4. The method of claim 1, further comprising determining, for a first pixel of a hologram displayed onto a spatial light modulator (SLM), an average contrast value of the image of the initial graphic captured by the camera.

5. The method of claim 4, wherein the average contrast value of the image of the initial graphic captured by the camera is determined using a following equation:

$$C = \frac{\overline{W} - \overline{B}}{\overline{W} + \overline{B}}$$

where:
$\overline{W}$ is an average intensity of a white portion of the image captured by the camera;
$\overline{B}$ is an average intensity of a background portion of the image captured by the camera; and
C is the average contrast value.

6. The method of claim 5, wherein the image is one of a plurality of images at different eyellipse positions, capturing the image of the initial graphic with the camera inside the vehicle includes capturing the plurality of images at the different eyellipse positions.

7. The method of claim 6, further comprising creating a plurality of look-up tables for phase values at the different eyellipse positions.

8. A vehicle, comprising:
    a windshield;
    a holographic head-up display (HUD) including a spatial light modulator (SLM) and a light source, wherein the light source is configured to emit a light beam toward the SLM, the SLM is configured to modulate the light beam, and the holographic HUD is configured to project an initial graphic on the windshield;
    a camera positioned to capture an image of the initial graphic; and
    a controller in communication with the holographic HUD and the camera, wherein the controller is programmed to:
        command the holographic HUD to project the initial graphic on the windshield;
        command the camera to capture the image of the initial graphic;
        command the SLM to iteratively change a phase value of the light beam generating a plurality of pixels of the initial graphic by a predetermined step to generate a plurality of updated graphics until a loss function value between each of the plurality of updated graphics and a target graphic is less than a predetermined value;
        iteratively determine the loss function value between each of the plurality of updated graphics and the target graphic until the loss function value is less than the predetermined value; and
        command the holographic HUD to display a latest one of the plurality the updated graphics on the windshield of the vehicle.

9. The vehicle of claim 8, wherein the loss function value is determined using a following equation:

$$\mathcal{L} = \sum_{m=1}^{M}\sum_{n=1}^{N} |a_{cap}(m, n) - a_{target}(m, n)|$$

where:
$\mathcal{L}$ is the loss function value;
M is a total number of pixels of the image captured by the camera in an x-direction;
N is a total number of pixels of the image captured by the camera in an y-direction;
n is one of the total number of pixels M in the x-direction;
m is one of the total number of pixels N in the y-direction;
$a_{target}$ is the target graphic; and
$a_{cap}$ is the image captured by the camera.

10. The vehicle of claim 8, wherein the controller is programmed to save a phase value of a hologram that corresponds to a lowest loss function value.

11. The vehicle of claim 8, wherein the controller is programmed to determine an average contrast value of the image of the initial graphic captured by the camera for a first pixel of the image.

12. The vehicle of claim 11, wherein the average contrast value of the image of the initial graphic captured by the camera is determined using a following equation:

$$C = \frac{\overline{W} - \overline{B}}{\overline{W} + \overline{B}}$$

where:
$\overline{W}$ is an average intensity of a white portion of the image captured by the camera;
$\overline{B}$ is an average intensity of a background portion of the image captured by the camera; and
C is the average contrast value.

13. The vehicle of claim 12, wherein the image is one of a plurality of images at different eyellipse positions, the controller is programmed to command the camera to capture the plurality of images at the different eyellipse positions.

14. The vehicle of claim 13, wherein the controller is programmed to create a plurality of look-up tables for the average contrast value at the different eyellipse positions.

* * * * *